United States Patent
Kasuya et al.

(10) Patent No.: US 8,549,959 B2
(45) Date of Patent: Oct. 8, 2013

(54) HYBRID DRIVE DEVICE

(75) Inventors: Satoru Kasuya, Nishio (JP); Masashi Kito, Anjo (JP); Yuichi Seki, Akazaki (JP); Yusuke Takahashi, Anjo (JP); Mitsugi Yamashita, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 164 days.

(21) Appl. No.: 13/379,153

(22) PCT Filed: Sep. 17, 2010

(86) PCT No.: PCT/JP2010/066262
§ 371 (c)(1),
(2), (4) Date: Dec. 19, 2011

(87) PCT Pub. No.: WO2011/034191
PCT Pub. Date: Mar. 24, 2011

(65) Prior Publication Data
US 2012/0096985 A1   Apr. 26, 2012

(30) Foreign Application Priority Data

Sep. 18, 2009  (JP) .................................. 2009-218120

(51) Int. Cl.
*F16H 37/06* (2006.01)
(52) U.S. Cl.
USPC .......................................................... 74/661
(58) Field of Classification Search
USPC ..................... 74/661, 665 R, 665 A, 665 B
See application file for complete search history.

(56) References Cited

U.S. PATENT DOCUMENTS

| 5,309,789 | A | * | 5/1994 | Kameda et al. ............. 74/606 R |
| 5,415,603 | A | * | 5/1995 | Tuzuki et al. ..................... 477/5 |
| 5,467,668 | A | * | 11/1995 | Kameda et al. ............. 74/606 R |
| 5,492,189 | A | * | 2/1996 | Kriegler et al. ............ 180/65.23 |
| 5,509,329 | A | * | 4/1996 | Jackson et al. .............. 74/606 R |

(Continued)

FOREIGN PATENT DOCUMENTS

| JP | A-06-107007 | 4/1994 |
| JP | A-09-156388 | 6/1997 |

(Continued)

OTHER PUBLICATIONS

Dec. 14, 2010 International Search Report issued in Application No. PCT/JP2010/066262 (with English translation).

(Continued)

*Primary Examiner* — Ha D Ho
(74) *Attorney, Agent, or Firm* — Oliff & Berridge, PLC (57) ABSTRACT

A hybrid drive system includes an input shaft of an automatic transmission, a clutch, an intermediate shaft, and a first gear disposed on a first shaft coaxial with an engine output shaft. An electric motor and a second gear provided on an output shaft of the electric motor are disposed on a second shaft. A rotation of the engine output shaft is transmitted to the input shaft through the clutch and the intermediate shaft, and a rotation of the electric motor is transmitted to the input shaft through the second gear and the first gear. The intermediate shaft is supported by a first support wall through a bearing. The clutch is disposed between the intermediate shaft and the engine output shaft, and a front side of the input shaft is rotatably supported by a second support wall, and connected to a rear side of the intermediate shaft through a spline.

8 Claims, 6 Drawing Sheets

(56) References Cited

U.S. PATENT DOCUMENTS

| | | | | |
|---|---|---|---|---|
| 5,558,589 A | * | 9/1996 | Schmidt | 475/5 |
| 5,571,058 A | * | 11/1996 | Schmidt | 475/5 |
| 5,875,691 A | | 3/1999 | Hata et al. | |
| 6,871,129 B2 | | 3/2005 | Kitaori et al. | |
| 2008/0015085 A1 | | 1/2008 | Chapelon et al. | |
| 2008/0121446 A1 | | 5/2008 | Sanji | |
| 2009/0105040 A1 | | 4/2009 | Sanji | |

FOREIGN PATENT DOCUMENTS

| | | |
|---|---|---|
| JP | A-2002-340166 | 11/2002 |
| JP | A-2005-265069 | 9/2005 |
| JP | A-2006-501425 | 1/2006 |
| JP | A-2006-183760 | 7/2006 |
| JP | A-2008-501899 | 1/2008 |
| JP | A-2008-132812 | 6/2008 |
| JP | A-2009-101729 | 5/2009 |
| JP | A-2009-208702 | 9/2009 |

OTHER PUBLICATIONS

Jun. 26, 2012 Partial Translation of an Office Action issued in Japanese Patent Application No. 2010-210234.
Sep. 14, 2010 International Search Report issued in PCT/JP2010/005104 (with translation).

* cited by examiner

|   | C-1 | C-2 | C-3 | B-1 | B-2 | B-3 | F-1 | F-2 |
|---|---|---|---|---|---|---|---|---|
| 1ST | O |  |  |  |  | (O) |  | O |
| 2ND | O |  |  | (O) | O |  | O |  |
| 3RD | O | O |  |  | O |  |  |  |
| 4TH |  | O |  |  | O |  |  |  |
| REV |  |  | O |  |  |  |  |  |

(O): ENGINE BRAKE IN OPERATION

HYBRID DRIVE DEVICE

TECHNICAL FIELD

The present invention relates to a hybrid drive system in which an engine and an electric motor drive a vehicle wheel, and more specifically relates to a hybrid drive system that integratedly incorporates an electric motor and a multi-speed or continuously variable automatic transmission device.

BACKGROUND ART

Hybrid drive systems proposed in related art are configured such that an automatic transmission device is disposed on a first shaft that is coaxial with an engine output shaft, and an electric motor is disposed on a second shaft different from the first shaft, wherein a rotation is transmitted from an output shaft of the electric motor through a reduction gear to an input shaft of the automatic transmission device on the first shaft (see Patent Documents 1 and 2).

In the hybrid drive system described in Patent Document 1, the input shaft on the first shaft is supported by a case through a bearing, and a drive gear (first gear) to which power from the electric motor is transmitted is in spline engagement with and supported by the input shaft inside the case. Further, a portion of the input shaft projects outside the case and is connected to the engine output shaft through a clutch and a damper.

In the hybrid drive system described in Patent Document 2, a first gear disposed on the first shaft constitutes the gear that reduces the speed of the rotation from the electric motor, and a clutch that allows and cuts off power transmission between the engine output shaft and the input shaft of the automatic transmission device is disposed inside the first gear. The first gear is formed from a hollow structure that houses the clutch. An engine side of the first gear is supported by a partition (first support wall) through a first bearing, and a transmission device side of the first gear is supported by a pump body (second support wall) through a second bearing, such that the first gear has a structure supported on both sides. An intermediate shaft acting as an input side of the clutch is connected to the engine output shaft through the damper, and an output side of the clutch is connected to the first gear and the input shaft of the transmission device. The intermediate shaft is rotatably supported by the first gear through a needle bearing.

CITATIONS OF RELATED ART

Patent Documents

Patent Document 1: Japanese Patent Application Publication No. JP-A-H09-156388
Patent Document 2: Japanese Patent Application Publication No. JP-A-2009-101729

DISCLOSURE OF THE INVENTION

Problem to be Solved by the Invention

In the hybrid drive system of Patent Document 1, the drive gear (first gear) and the clutch are in spline engagement with the input shaft of the automatic transmission device. However, a supporting accuracy of the drive gear (first gear) can be further improved.

In the hybrid drive system of Patent Document 2, the clutch is housed inside the first gear. For this reason, the first gear is formed of an input-side radial extending portion with a recessed shape, and an intermediate shaft-side radial extending portion that accommodates and covers the clutch in the recessed portion. After accommodating the clutch in the intermediate shaft-side radial extending portion, it is necessary to integrally fix the intermediate shaft-side radial extending portion to the input-side radial extending portion by welding or the like. However, warping or the like may occur at the fixed part, which means that the first gear may not have sufficient supporting accuracy in terms of the extending portions on the input side and the intermediate shaft side of the first gear that are supported by the first bearing and the second bearing, respectively.

Assemblability is improved because the input shaft of the transmission device is connected by a spline to the intermediate shaft-side radial extending portion. However, the supporting accuracy of the input shaft may be affected by the use of a configuration in which the input shaft of the transmission device is supported by the second bearing through the intermediate shaft-side radial extending portion.

In view of the foregoing, it is an object of the present invention to provide a hybrid drive system that improves a supporting accuracy of a first gear, and supports an input shaft of an automatic transmission device with high accuracy.

Means for Solving the Problem

The present invention is a hybrid drive system ($1$, $1_2$), wherein an input shaft (7) of an automatic transmission device ($3$, $3_2$), a clutch (27), an intermediate shaft ($4$, $4_2$), and a first gear (23) are disposed on a first shaft (I) coaxial with an engine output shaft (2). An electric motor (6), and a second gear (19) provided on an output shaft (15) of the electric motor are disposed on a second shaft (11) different from the first shaft (I). A rotation of the engine output shaft (2) is transmitted to the input shaft (7) of the automatic transmission device through the clutch (27) and the intermediate shaft ($4$, $4_2$), and a rotation of the electric motor (6) is transmitted to the input shaft (7) of the automatic transmission device through the second gear (19) and the first gear (23). A first support wall ($12b_1$, $12h$) and a second support wall ($12e$, $12i$) that are integrated with a case (12) are respectively provided on an axial front side that is an engine output shaft side and an axial rear side that is an automatic transmission device side of the first gear (23). The first gear (23) and the intermediate shaft ($4$, $4_2$) are integratedly formed with the intermediate shaft provided extending from the axial front side of the first gear, and the intermediate shaft is rotatably supported by the first support wall ($12b_1$, $12h$) through a bearing (45). The clutch (27) is disposed between the intermediate shaft ($4$, $4_2$) and the engine output shaft (2) on an axial front side of the first support wall ($12b_1$, $12h$). A front side of the input shaft (7) of the automatic transmission device is rotatably supported by the second support wall ($12e$, $12i$), and connected to a rear side of the intermediate shaft ($4$, $4_2$) through a spline (26).

Note that, in the present invention, a "gear" refers to transmission means for transmitting power in a fitted relationship, and includes a toothed gear and a sprocket that transmits power through a chain.

A "bearing" refers to a member that rotatably supports a shaft, and includes rolling bearings such as a ball bearing, a roller bearing, and a needle bearing, and also includes sliding bearings such as a bushing.

Figure 2:
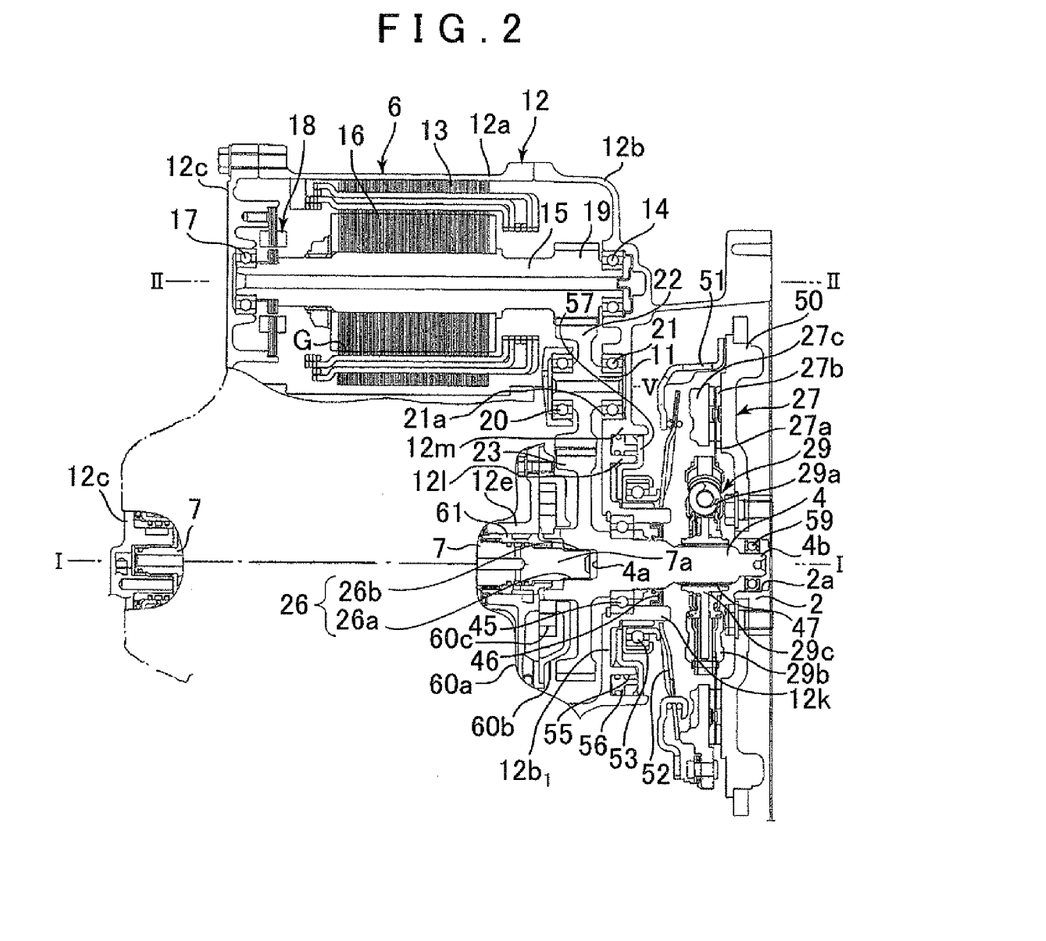
FIG. 2 is a front cross-sectional view that shows an essential portion of the hybrid drive system.

Referring to FIG. 2, for example, a front side of the intermediate shaft (4) and a rear side of the engine output shaft (2) are mutually supported through a bearing (59).

Referring to FIG. 2, for example, the clutch is a dry single-plate clutch (27). The dry single-plate clutch is operated by a hydraulic actuator that includes a cylinder (55) formed on the first support wall (12b₁) and a piston (56) that fits with the cylinder. The hydraulic actuator (55, 56) is disposed so as to overlap in an axial direction with the bearing (45) that supports the intermediate shaft (4).

Referring to FIG. 2, for example, the first gear (23) and the second gear (19) are toothed gears, and move in association through a toothed idler gear (22). An idling shaft (11) that includes the toothed idler gear (22) has an axial front that is rotatably supported by the first support wall (12b₁) through a bearing (21), and an axial rear that is rotatably supported by the case through a bearing (20). The hydraulic actuator (55, 56) is disposed so as to overlap in the axial direction with the bearing (21) that supports an axial front side of the idling shaft (11).

Referring to FIG. 2, for example, the clutch is a dry single-plate clutch (27). A damper (29) is disposed between the clutch (27) and the intermediate shaft (4), and at least partially overlaps with the clutch (27) in the axial direction.

Figure 1:
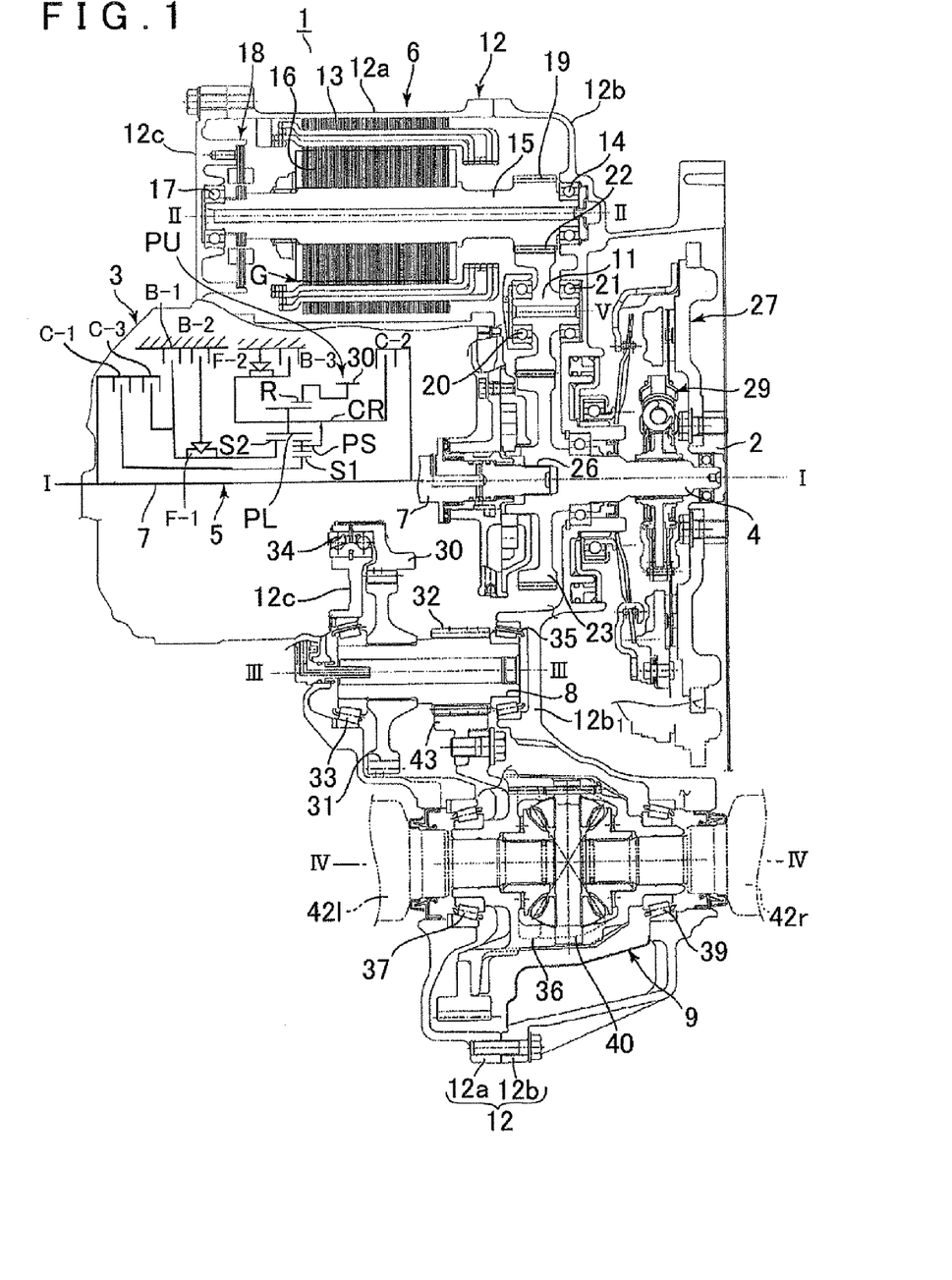
FIG. 1 is a front cross-sectional view that shows a hybrid drive system according to the present invention, which uses a multi-speed automatic transmission device.

Referring to FIG. 1, for example, the automatic transmission device is a multi-speed transmission device (3) that includes a multi-speed speed change mechanism (5) that switches a transmission route formed by a plurality of gears through a clutch.

Referring to FIG. 1, for example, the hybrid drive system further includes a counter shaft (8) disposed on a third shaft (III); and a differential device (9) disposed on a fourth shaft (IV). The multi-speed speed change mechanism (5) is disposed on the first shaft (I), and an output rotation of the multi-speed speed change mechanism is transmitted to the counter shaft (8) through a gear (30, 31), and a rotation of the counter shaft is further transmitted to the differential device (9) through a gear (32, 43). The counter shaft (8) has an axial front side and an axial rear side each rotatably supported by the case (12) through a bearing (35, 33). A support portion (12b₁) of the case that supports the axial front side of the counter shaft (8) is disposed so as to overlap in the axial direction with the first gear (23).

Figure 4:
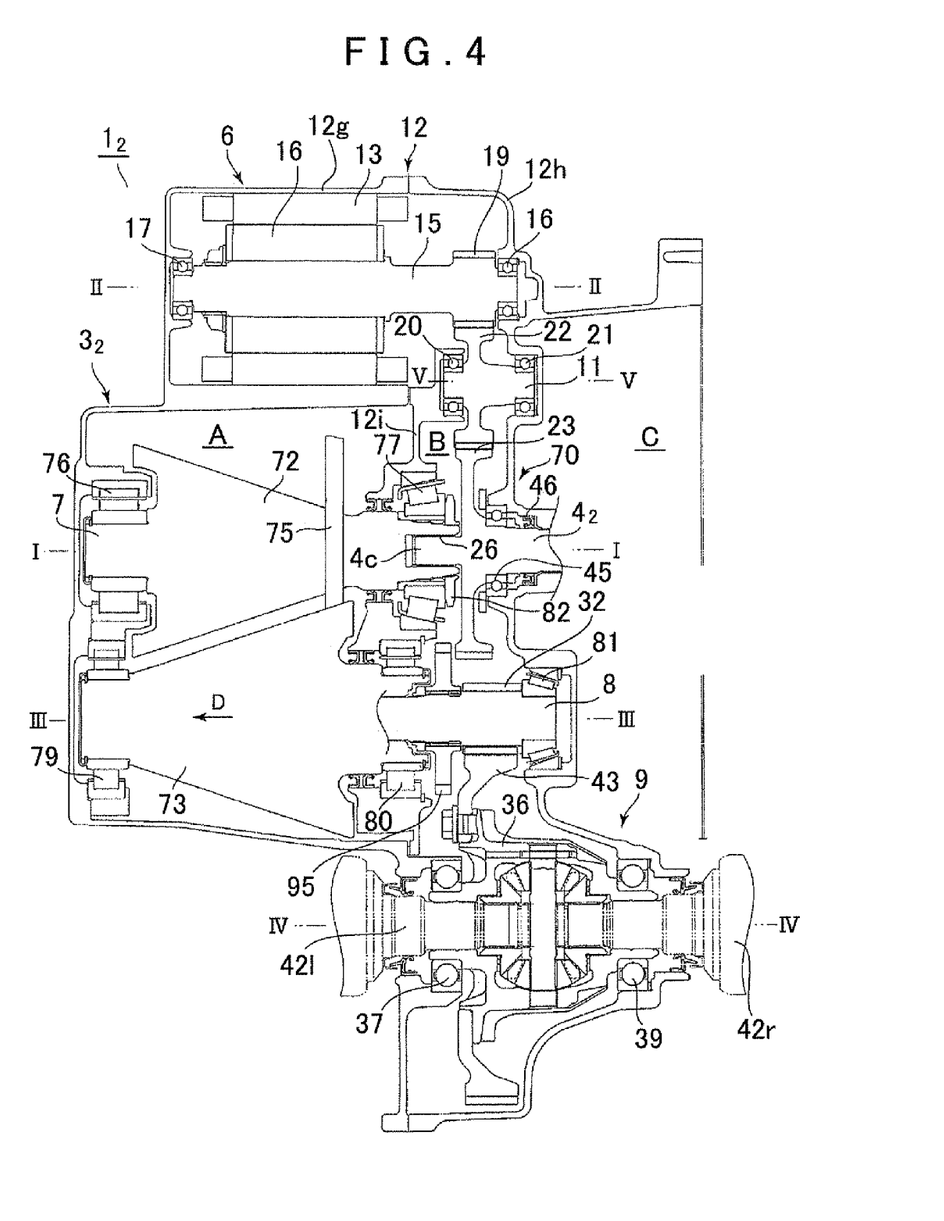
FIG. 4 is a front cross-sectional view that shows a hybrid drive system according to the present invention, which uses a continuously variable automatic transmission device.
Figure 6:
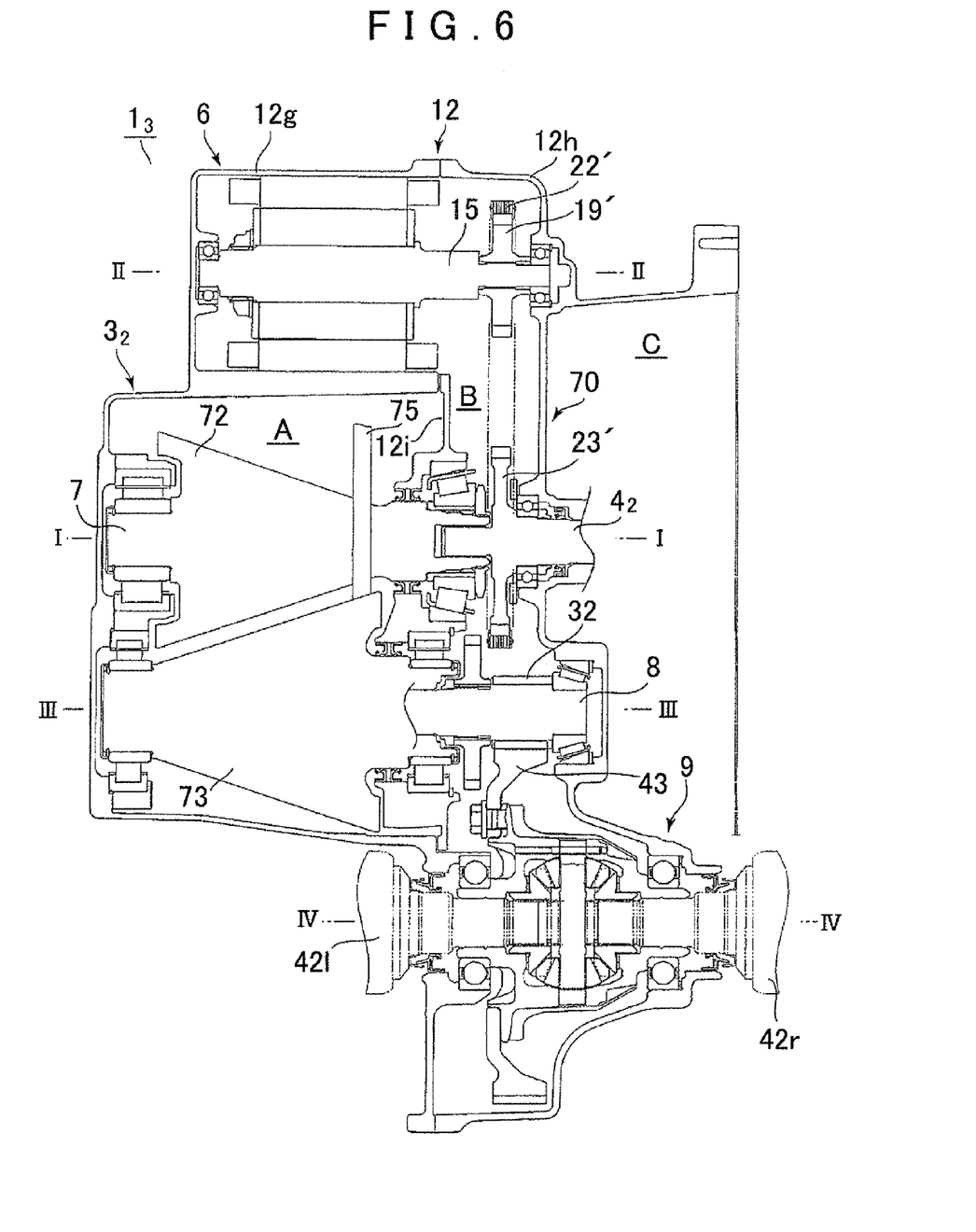
FIG. 6 is a front cross-sectional view that shows a partially modified hybrid drive system.

Referring to FIGS. 4 and 6, for example, the automatic transmission device is a continuously variable automatic transmission device that includes an input member (72) drive-coupled to the input shaft (7), and an output member (73). A contact position between the input member and the output member is changed, and a rotation of the input member is steplessly changed in speed and transmitted to the output member by a shear force of an oil film interposed at the contact position.

Referring to FIGS. 4 and 6, for example, the continuously variable automatic transmission device includes the counter shaft (8) disposed on the third shaft (III), and the differential device (9) disposed on the fourth shaft (IV). The continuously variable automatic transmission device is a cone ring type continuously variable transmission device (3₂), wherein the input member (72) and the output member (73) are formed from conical friction wheels that are disposed such that axis lines of the friction wheels are mutually parallel, and small diameter portions and large diameter portions of the friction wheels are respectively reversed in the axial direction. A ring (75) is interposed between opposing inclined surfaces of the friction wheels and moves in the axial direction to change a speed. The input member (72) formed of the conical friction wheel is disposed on the first shaft (I), and the output member (73) formed of the conical friction wheel is disposed on the third shaft (III). A rotation of the output member (73) of the cone ring type continuously variable transmission device (3₂) is transmitted to the counter shaft (8), and a rotation of the counter shaft is further transmitted to the differential device (9) through a gear.

Thus, by using a cone ring type continuously variable transmission device as the continuously variable transmission device, disposing the input member formed of the conical friction wheel on the first shaft, and disposing the output member similarly formed of the conical friction wheel on the third shaft that is the counter shaft, greater compactness can be achieved and vehicle mountability secured.

It should be noted that the reference numerals in parentheses show correspondence to the reference numerals in the drawings. However, these reference numerals do not have any influence on the constitutions of the claims.

Effects of the Invention

According to claim 1 of the present invention, the intermediate shaft is integratedly fixed with the first gear on the axial rear side of the first support wall, and connected to the clutch on the axial front side of the first support wall. In addition, the intermediate shaft is rotatably supported by the first support wall through the bearing, and the rear side of the intermediate shaft is connected to the input shaft through the spline. Moreover, the input shaft is supported by the second support wall. Therefore, the supporting accuracy of the first gear can be improved while also improving the supporting accuracy of the input shaft.

The intermediate shaft formed extending forward from the first gear is rotatably supported by the first support wall through the bearing. Therefore, the shaft-supporting accuracy of the first gear and the intermediate shaft can be improved. In addition, the input shaft of the automatic transmission device is rotatably supported by the second support wall, and connected to the intermediate shaft through the spline. Therefore, the input shaft is supported with high accuracy, the reliability and durability of the automatic transmission device is improved, and the electric motor achieves high shaft-supporting accuracy. Accordingly, the performance and durability of the hybrid drive system can be improved.

According to claim 2 of the present invention, the intermediate shaft is supported by the first support wall through the bearing. Therefore, regardless of whether the engine output shaft experiences slight axial vibrations due to explosion vibrations, the front side of the intermediate shaft is connected and supported by the bearing between the engine output shaft and the intermediate shaft. Accordingly, high concentric accuracy of the intermediate shaft and the engine output shaft is ensured, and the clutch can always be engaged in a stable manner at an appropriate position.

According to claim 3 of the present invention, the hydraulic actuator that operates the dry single-plate clutch is disposed overlapping in the axial direction with the bearing that supports the intermediate shaft. Therefore, an axial space dedicated to the hydraulic actuator is not required and a shorter axial dimension can be achieved accordingly.

According to claim 4 of the present invention, the first gear and the second gear are toothed gears, and move in association through the toothed idler gear. Therefore, the rotation of the electric motor can be transmitted to the input shaft of the automatic transmission device at a predetermined reduction ratio. At the same time, the automatic transmission device and the electric motor can be disposed closer together without interference from a support part of the idling shaft that supports the toothed idler gear. Thus, the hybrid drive system can be made even more compact.

In addition, the hydraulic actuator that operates the dry single-plate clutch is disposed overlapping in the axial direction with the bearing that supports the front side of the idling shaft. Therefore, the axial dimension can be kept short.

According to claim 5 of the present invention, the damper can be disposed so as to at least partially overlap in the axial direction with the clutch that is a dry single-plate clutch. Therefore, the axial dimension can be kept short while also disposing the damper. Accordingly, the explosion vibrations of the engine output shaft can be absorbed, and the power from the engine and the power from the electric motor can be transmitted to the input shaft of the automatic transmission device in a highly reliable and stable manner.

According to claim 6 of the present invention, a multi-speed automatic transmission device with a long history and track record is used as the automatic transmission device. Therefore, a highly reliable hybrid drive system can be provided.

According to claim 7 of the present invention, the multi-speed speed change mechanism is disposed on the first shaft, and the support portion that supports the front side of the counter shaft is disposed overlapping in the axial direction with the first gear. Therefore, the rear side of the third shaft that is the counter shaft can be shortened to improve vehicle installation performance.

According to claim 8 of the present invention, a continuously variable automatic transmission device is used as the automatic transmission device. Therefore, together with driving of the electric motor, the most efficient speed ratio can be set to provide a hybrid drive system with high fuel efficiency.

BEST MODES FOR CARRYING OUT THE INVENTION

A hybrid drive system to which the present invention is applied will be described below with reference to the attached drawings. As shown in FIGS. 1 and 2, a hybrid drive system 1 is mounted in an FF type of vehicle. An intermediate shaft 4 and a multi-speed speed change mechanism 5 of an automatic transmission device 3 are disposed on a first shaft I that is coaxial with an engine output shaft (crankshaft) 2. An electric motor 6 is disposed on a second shaft II that is different from the first shaft. The hybrid drive system 1 further includes a third shaft III that is different from the first and second axes and formed from a counter shaft 8; a fourth shaft IV that is formed from a differential device 9; and a fifth shaft V that is formed from an idling shaft 11 of a reduction gear device that transmits power from the electric motor 6 to an input shaft 7 of the automatic transmission device 3. Each of the shafts on the first to fifth axes is supported by a case 12. The case 12 includes a cylindrical main case 12a; a clutch housing 12b that is disposed on a front side (engine side) of the main case; and a rear case 12c that is disposed on a rear side of the main case. These cases are integratedly fixed to form the case 12 as a structure divided into three sections. In a usage state of the case 12, a front end surface of the clutch housing 12b is integratedly fixed to an engine (not shown).

The electric motor 6 is formed from a stator 13 that is fixed to the main case 12a, and a rotor 16 that is integral with a motor output shaft 15. Front and rear end parts of the motor output shaft 15 are rotatably supported with high accuracy by the clutch housing 12b and the rear case 12c through ball bearings 14, 17, respectively. The electric motor 6 is preferably a brushless DC motor in which coils are embedded on a stator 13 side and permanent magnets are embedded on a rotor 16 side, but another motor may be used. A rotation angle detection portion 18 such as a resolver that detects a rotation angle of the electric motor 6 is disposed between the rear case and a rear case 12c side of the output shaft 15. The front side (engine side) of the motor output shaft 15 is formed together with a toothed gear (pinion) 19 that constitutes a second gear.

The idling shaft 11 on the fifth shaft V has a rear end side that is rotatably supported by the main case 12a through a ball bearing 20, and a front end side that is rotatably supported by the clutch housing 12b through a ball bearing 21. The idling shaft 11 includes a toothed idler gear 22. The toothed idler gear 22 is meshed with the pinion 19 that is the second gear, and also meshed with a toothed gear (first gear) 23 that is formed on the intermediate shaft 4. The toothed idler gear 22 configures a reduction gear device that reduces the speed of the rotation of the motor output shaft 15, and transmits the reduced-speed rotation to the intermediate shaft 4. The toothed idler gear 22 is disposed partially overlapping with the electric motor 6 in a radial direction when viewed from the side (that is, when viewed in an axial direction).

Specifically, the second gear 19 consisting of a pinion has a small diameter and the first gear 23 has a large diameter, which increases the gear ratio at which power is transmitted from the second gear 19 to the first gear via the toothed idler gear 22 (obtains a large reduction ratio). In addition, the bearing 20 that supports the rear end side of the idling shaft 11 can be disposed closer to the output shaft 15 of the electric motor 6. Thus, the multi-speed automatic transmission device 3 and the electric motor 6 can be disposed closer together in the radial direction without an idling shaft supporting portion of the main case 12a interfering with the automatic transmission device 3.

A rear side of the intermediate shaft 4 is integratedly formed with the toothed gear 23 that constitutes the first gear, and the intermediate shaft 4 is connected to the input shaft 7 through a spline 26. The intermediate shaft 4 is formed so as to extend forward from the toothed gear 23, and a front side part of the intermediate shaft 4 connects to the engine output shaft 2 through a dry clutch 27 and a damper 29.

The multi-speed automatic transmission device 3, as roughly shown in FIG. 1, includes the automatic speed change mechanism 5 that has a planetary gear unit PU disposed on the first shaft I. The planetary gear unit PU includes, as four rotating elements, a sun gear S1, a sun gear S2, a carrier CR, and a ring gear R. The planetary gear unit PU is a so-called Ravigneaux type planetary gear in which a long pinion PL that meshes with the sun gear S2 and the ring gear R and a short pinion PS that meshes with the sun gear S1 both mesh with the carrier CR.

The sun gear S2 of the planetary gear unit PU is held stationary with respect to a brake B-1 and a transmission case 12 by connecting to the brake B-1 through a one-way clutch F-1. The sun gear S2 is also connected to a clutch C-3, and can be input with the rotation of the input shaft 7 through the clutch C-3. The sun gear S1 is connected to a clutch C-1, and can be input with the rotation of the input shaft 7.

The carrier CR is connected to a clutch C-2 into which the rotation of the input shaft 7 is input and can be input with the rotation of the input shaft 7 through the clutch C-2. The carrier CR is also connected to a one-way clutch F-2 and a brake B-3. The rotation that is input through the one-way clutch F-2 is restricted to rotation in one direction in relation to the transmission case 12, and the rotation that is input through the brake B-3 is stationary. The ring gear R is connected to a counter driving gear 30, and the counter driving gear 30 meshes with a counter driven gear 31 of the counter shaft 8. The counter driving gear 30 is rotatably supported by the partition 12c formed on the main case 12a through a bearing 34.

Figure 3:
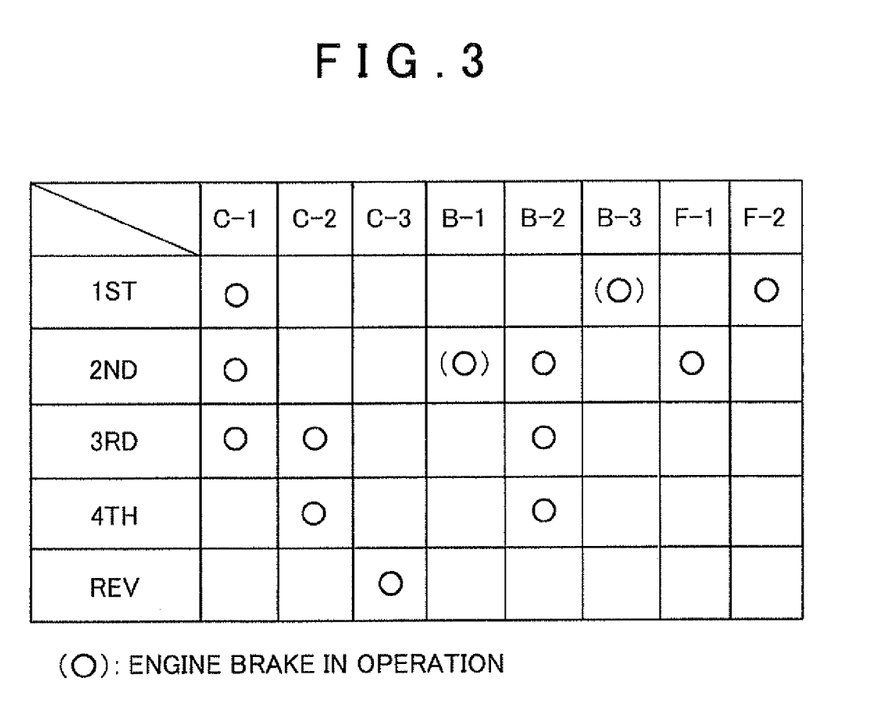
FIG. 3 is an operation chart of the multi-speed automatic transmission device.

FIG. 3 is an operation chart of the multi-speed automatic transmission device 3 described above. The automatic transmission device 3 operates the clutches and brakes in the combinations shown in the operation chart so as to form gear speeds for first to fourth forward speeds and a first reverse speed.

The counter shaft 8 on the third shaft III is integratedly fixed with the counter driven gear 31 formed from a large-diameter toothed gear, and also integratedly formed with a pinion 32 formed from a small-diameter toothed gear. The counter shaft 8 has a rear end side that is rotatably supported by the main case 12a through a tapered bearing 33, and a front end side that is rotatably supported by the clutch housing 12b through a tapered bearing 35. A support wall part $12b_1$ of the clutch housing 12b to which the tapered bearing 35 is mounted is disposed overlapping in the axial direction (as viewed from the radial direction) with the first gear 23. Thus, the counter shaft 8 can be disposed toward the front side (engine side) to shorten the third shaft III section.

The differential device 9 on the fourth shaft IV includes a differential case 36, and the differential case 36 has a rear end side that is rotatably supported by the main case 12a through a ball bearing 37, and a front end side that is rotatably supported by the clutch housing 12b through a ball bearing 39. A shaft 40 that is perpendicular to the axial direction is attached inside the differential case 36, and bevel gears fixed to the shaft 40 mesh with bevel gears fixed to left and right axle shafts 42l, 42r. A differential ring gear 43 is integratedly fixed to the differential case 36, and the differential ring gear 43 meshes with the small-diameter counter shaft pinion 32. The left and right axle shafts 42l, 42r run through the differential case 36 and extend to an outer side of the case 12, and connect to left and right front wheels that are drive wheels.

Therefore, the rotation changed in speed as appropriate by the multi-speed automatic transmission device 3 is transmitted to the differential case 36 through the counter driving gear 30, the counter driven gear 32, the counter pinion 32, and the differential ring gear 43, and the rotation is further output to the left and right axle shafts 42l, 42r as a differential rotation.

Next, a shaft support structure on the first shaft I that is an essential portion of the present invention will be described with reference to FIG. 2.

On the first shaft I, the intermediate shaft 4 from the engine output shaft 2 and the input shaft 7 of the automatic transmission device 3 are disposed, and the intermediate shaft 4 is rotatably supported through one ball bearing 45 mounted on the clutch housing 12b that constitutes the first support wall. The first gear 23 formed from a toothed gear is either formed together with the intermediate shaft 4, or integratedly formed by interference fitting or the like. A bottomed hole 4a that has a female spline 26a is formed on a rear end side of the intermediate shaft 4, which extends forward from the first gear 23. A front side of the input shaft 7 is a small-diameter shaft 7a that has a male spline 26b. The female spline 26a and the male spline 26b are engaged and rotate together.

The first gear 23 is disposed along with the automatic transmission device 5, the counter gears 30, 32, and the differential device 9 in a lubricated space inside the transmission case 12 of the first support wall $12b_1$ formed from the clutch housing. The intermediate shaft 4 that projects forward from the first gear 23 runs through the bearing 45 and an oil seal 46, and projects outward from the first support wall $12b_1$. The ball bearing 45 is disposed near the first gear 23 of the intermediate shaft 4, and supports a generally center part of the intermediate shaft 4 in the axial direction. The damper 29 is engaged through a spline 47 with a distal end part of the intermediate shaft 4 that projects outward. In the damper 29, a driving plate 29b and a driven plate 29c sandwich a coil spring 29a and are connected rotatable by a predetermined amount relative to one another. The driven plate 29c is engaged with the intermediate shaft 4 through the spline 47, and the driving plate 29b is fixed with a cushion plate 27a of the clutch 27 that is provided extending in the radial direction.

The clutch 27 includes a clutch facing 27b and a pressure plate 27c that are disposed so as to sandwich the cushion plate 27a. The clutch facing 27b is joined together with a flywheel 50 that is fixed by a bolt to a distal end of the engine output shaft 2. The pressure plate 27c is biased by a spring so as to contact the cushion plate 27a between the pressure plate 27c and a clutch cover 51 attached to the flywheel 50. A diaphragm spring 52 is supported by the clutch cover 51 with a radial intermediate portion of the diaphragm spring 52 acting as a fulcrum. The damper 29 and the clutch 27, more precisely the cushion plate 27a, the clutch facing 27b, and the pressure plate 27c, are disposed almost completely overlapping in the axial direction, and there is no need for a space in the axial direction dedicated to accommodating the damper 29.

A release bearing 53 is supported axially slidable by a predetermined amount in the axial direction on an outer periphery of a ring-like flange portion 12k that supports the bearing 45 of the first support wall $12b_1$. The release bearing 53 is in contact with an inner-diameter base end portion of the diaphragm spring 52. The first support wall $12b_1$ is formed with a cylinder 55, which is formed from a ring-like recessed portion coaxial with the first shaft I (intermediate shaft 4), and the cylinder 55 is fitted with a piston 56 in an oil-tight manner. The piston 56 and the release bearing 53 are connected through a stepped plate 57, and the clutch 27 is operated to engage and release by an expansion/contraction operation of a hydraulic actuator (hydraulic servo) formed from the cylinder 55 and the piston 56. The hydraulic actuator 55, 56 is disposed overlapping in the axial direction with the bearing 21 that supports the idling shaft 11 of the first support wall $12b_1$, and the bearing 45 that supports the intermediate shaft 4, to achieve a shorter axial dimension. In other words, the cylinder 55 is formed from two ring-like flange portions 12l, 12m that coaxially project from the first support wall $12b_1$ toward an axial front side, and the first support wall $12b_1$ that serves as a bottom portion between the ring-like flange portions 12l, 12m. An outer peripheral side of the outer ring-like portion 12m is formed so as to partially contact an outer race 21a of the bearing 21 that is used to support the idling shaft, thus shortening the axial dimension.

One ball bearing 59 is interposed between the small-diameter shaft 4b formed on a front end of the intermediate shaft 4 and a recessed hole 2a formed on a front end of the engine output shaft 2. The intermediate shaft 4 and the engine output shaft 2 maintain concentricity on the first shaft I through the ball bearing 59.

A second support wall 12e is adjacently disposed on a rear side of the first gear 23. The second support wall 12e is formed from an oil pump cover 60a that is configured integral with the main case 12a, and a pump body 60b that is integratedly fixed to the pump cover. The second support wall 12e constitutes an integrated fixing support member together with the case 12. A pump gear 60c that is connected to and rotates together with the intermediate shaft 4 is accommodated inside the pump body 60a and the pump cover 60b, and constitutes an oil pump. A front end side of the input shaft 7 is rotatably supported by the second support member 12e through a rotation support member 61 that includes a bushing and a needle bearing. A rear end side of the input shaft 7 is rotatably supported by the rear case 12c through a bushing or the like. Therefore, the input shaft 7 is supported with high accuracy by using a structure supported on both sides by the case.

The shaft support structure on the first shaft I is configured as described above, and the intermediate shaft 4 is supported through the ball bearing 45 by the first support wall $12b_1$ near the front side of the first gear 23. The front end part of the intermediate shaft 4 is supported by the engine output shaft 2 through the ball bearing 59 to maintain concentricity. Regardless of whether the engine output shaft 2 experiences slight axial vibrations due to explosion vibrations, for example, the intermediate shaft 4 is supported with high accuracy by the two ball bearings 45, 59 as described above.

Even if the intermediate shaft 4 is affected by the explosion vibrations of the engine, for example, the vibrations are absorbed by the first gear 23 meshed with the toothed idler gear 22 and engaged with the spline 26. Therefore, the effect of such vibrations on the output shaft 15 of the electric motor and the input shaft 7 of the automatic transmission device 3 is small. Accordingly, the electric motor 6 is supported with high accuracy by the case 12 through the bearings 14, 17 on both end portions of the motor output shaft 15, and the stator 13 is fixed by the case 12. At the same time, an air gap G between the stator 13 and the rotor 16 can be kept to a small clearance and the electric motor 6 can generate power in a stable manner with high accuracy. The torque generated by the electric motor 6 is reliably transmitted to the input shaft 7 of the automatic transmission device 5 through the second gear 19, the toothed idler gear 22, and the first gear 23, and also through the intermediate shaft 4 and the spline 26.

Meanwhile, the power generated by the engine is transmitted from the engine output shaft 2 to the intermediate shaft 4 through the dry clutch 27 and the damper 29, and further transmitted to the input shaft 7 of the automatic transmission device 5 through the spline 26. At such time, pulsations (rotational vibrations) caused by the engine explosions are absorbed by the damper 29, and the concentricity of the engine output shaft 2 and the intermediate shaft 4 is constantly secured by the bearing 59. The clutch 27 can transmit torque with high accuracy and reliability through the friction contact of the cushion plate 27a, the clutch facing 27b, and the pressure plate 27c, which are in a constant highly concentric state.

The input shaft 7 is rotationally supported by the case 12 with high accuracy at both end parts. The rotation of the input shaft 7 is changed in speed as appropriate by the automatic speed change mechanism 5, and transmitted to the left and right axle shafts 42l, 42r through the counter gears 30, 31 and the differential device 9.

In the hybrid drive system 1, with the electric motor 6, the toothed idler gear 11, the automatic transmission device 3, the counter shaft 8, and the differential device 9 are assembled in the main case 12a and the rear case 12c, the integrated first gear 23 and intermediate shaft 4 are assembled in spline engagement (26) with the input shaft 7, and the clutch housing 12b is then assembled. After assembling the piston 56, the stepped plate 57, and the release bearing 53 to the intermediate shaft 4 that projects from the first support wall $12b_1$ of the clutch housing 12b, the clutch 27 and the damper 29 formed from a sub-assembly are assembled. As described above, the hybrid drive system 1 can be easily assembled. Moreover, by mounting the ball bearing 59 between the intermediate shaft 4 and the engine output shaft 2 and fixing the clutch housing 12b to the engine, the hybrid drive system 1 can be assembled for a hybrid drive vehicle.

Next, a hybrid drive system that uses a cone ring type continuously variable transmission device as an automatic transmission device will be described with reference to FIGS. 4 and 5. Note that like reference numerals will be used for parts having the same functions as those in the embodiment shown in FIGS. 1 and 2, and will not be described further below.

As shown in FIG. 4, a hybrid drive system $1_2$ includes the electric motor 6, a cone ring type continuously variable automatic transmission device (a friction type continuously variable transmission device) $3_2$, the differential device 9, an intermediate shaft $4_2$ that moves in accordance with the output shaft of the engine (not shown), and a gear transmission device 70. The above devices and shafts are accommodated in the case 12 that is formed by two case members, that is, case members 12g, 12h. Further, the case 12 includes the first space A and the second space B divided by a partition 12i in an oil-tight manner.

The cone ring type continuously variable transmission device $3_2$ includes a conical friction wheel 72 serving as an input member, a conical friction wheel 73 serving as an output member, and a ring 75 made of metal. The input member also configures the input shaft 7, which is a shaft member formed integral with the front and rear of the conical friction wheel 72. The friction wheels 72, 73 are disposed so as to be mutually parallel, and small diameter portions and large diameter portions of the friction wheels 72, 73 are respectively reversed in the axial direction. The ring 75 is interposed between opposing inclined surfaces of the friction wheels 72, 73 and surrounds one of the friction wheels, for example, the input-side friction wheel 72. A large thrust force acts on at least one of the friction wheels, and therefore the ring 75 is interposed between the inclined surfaces by a relatively large clamping force based on this thrust force. Specifically, a cam mechanism is formed between the output-side friction wheel 73 and an output shaft 8 that is the counter shaft on surfaces opposed to each other in the axial direction. The thrust force in a direction shown by an arrow D in the drawing is generated in accordance with the transferred torque, and a large clamping force is generated to act on the ring 75 between the output-side friction wheel 73 and the input-side friction wheel 72 that is supported in a direction that counters the thrust force.

The input shaft 7 that is the input-side friction wheel 72 includes a first-side (large diameter portion side) end portion supported by the first case member (rear case) 12g through a roller bearing 76, and a second-side (small diameter portion side) end portion supported by the partition 12i through a tapered roller bearing 77. The output-side friction wheel 73 includes a first-side (small diameter portion side) end portion supported by the first case member 12g through a roller bearing 79, and a second-side (large diameter portion side) end portion supported by the partition 12i through a roller (radial) bearing 80. The output shaft (counter shaft) 8, which applies to the output-side friction wheel 73 the thrust force acting in the direction shown by the arrow D as described above, includes a second-side end supported by the second case member (clutch housing) 12h through a tapered roller bearing 81. An inner race of the bearing 77 is interposed between a stepped portion and a nut 82 on the second-side end portion of the input-side friction wheel 72, and the thrust force that acts on the input-side friction wheel 72 through the ring 75 in the direction shown by the arrow D from the output-side friction wheel 73 is supported by the tapered roller bearing 77. On the other hand, a reaction force of the thrust force acting on the output-side friction wheel 73 acts on the output shaft 8 in a direction opposite to the direction shown by the arrow D, and the reaction force of the thrust force is supported by the tapered roller bearing 81.

The ring 75 moves in the axial direction by axial moving means, such as a ball screw, and changes the positions of contact between the ring 75 and the input-side friction wheel 72 and between the ring 75 and the output-side friction wheel 73, so as to steplessly change the speed by steplessly changing a rotation ratio between the input member 72 and the output member 73. The reaction force and the thrust force D corresponding to the transferred torque are canceled out by the tapered roller bearings 77, 81 in the integrated case 12, and an equilibrant force such as a hydraulic pressure or other external force is not required.

The output shaft 8 of the continuously variable transmission device is formed with a toothed gear (pinion) 32, and the toothed gear 32 meshes with the differential ring gear 43. The motor output gear (second gear) 19, the toothed idler gear 22, the first gear (toothed gear) 23, as well as the output gear (pinion) 32 of the continuously variable transmission device, and the differential ring gear (toothed gear) 43 constitute the gear transmission device 70. The motor output gear (second gear) 19 and the differential ring gear 43 are disposed overlapping each other in the axial direction, and the first gear 23 and the output gear 32 of the continuously variable transmission device are disposed overlapping the second gear 19 and the differential ring gear 43 in the axial direction. Note that, a gear 95, which is engaged with the output shaft 8a of the continuously variable transmission device through a spline, is a parking gear that locks the output shaft when a shift lever is in a parking position.

The intermediate shaft $4_2$ is configured as integrally molded or integrated with the first gear 23, and is formed so as to project from a front side of the first gear 23. The intermediate shaft $4_2$ is rotatably supported by the second case member 12h that constitutes the first support wall through the one ball bearing 45 at a position adjacent to the front side (engine side) of the intermediate shaft $4_2$. A rear side of the intermediate shaft $4_2$ is a small-diameter shaft 4c whose outer periphery is formed with a male spline. The small-diameter shaft 4c is fitted with a female spline of a bottomed hole that is formed on the front end side of the input shaft 7, such that the intermediate shaft $4_2$ and the input shaft of the continuously variable transmission device $3_2$ are in spline engagement (26). The intermediate shaft $4_2$ runs through the bearing 45 and the oil seal 46, and projects into a third space C that is on an outer side of the first support wall 12h. Although not shown in FIG. 4, a dry clutch (27) and a damper (29) similar to that shown in FIG. 2 are disposed in the third space C, which is an open space. In addition, a ball bearing (59) shown in FIG. 2 is similarly interposed between the intermediate shaft $4_2$ and the engine output shaft 2, and secures the concentricity of both shafts.

The dry clutch 27 shown in FIGS. 1 and 2 is operated by the hydraulic actuator. However, the hybrid drive system $1_2$ operates the continuously variable transmission device $3_2$ with an electric actuator, and preferably operates the above dry clutch with the electric actuator. That is, the release bearing (53) shown in FIG. 2 operates, through a sector gear and a ring, in accordance with a ball screw driven by the electric motor.

The gear transmission device 70 is accommodated in the second space B. The second space B is a space between the third space C, and the electric motor 6 and the first space A, in the axial direction. The second space B is defined in an oil-tight manner using an oil seal by the partition 12i that constitutes the second support wall and the second case member 12h that constitutes the first support wall. The second space B is filled with a predetermined amount of a lubricant oil such as ATF. The first space A defined by the first case member 12g and the partition 12i is similarly configured to be oil-tight, and is filled with a predetermined amount of a traction oil having a shear force, and a large shear force under an extreme pressure condition in particular.

Figure 5:
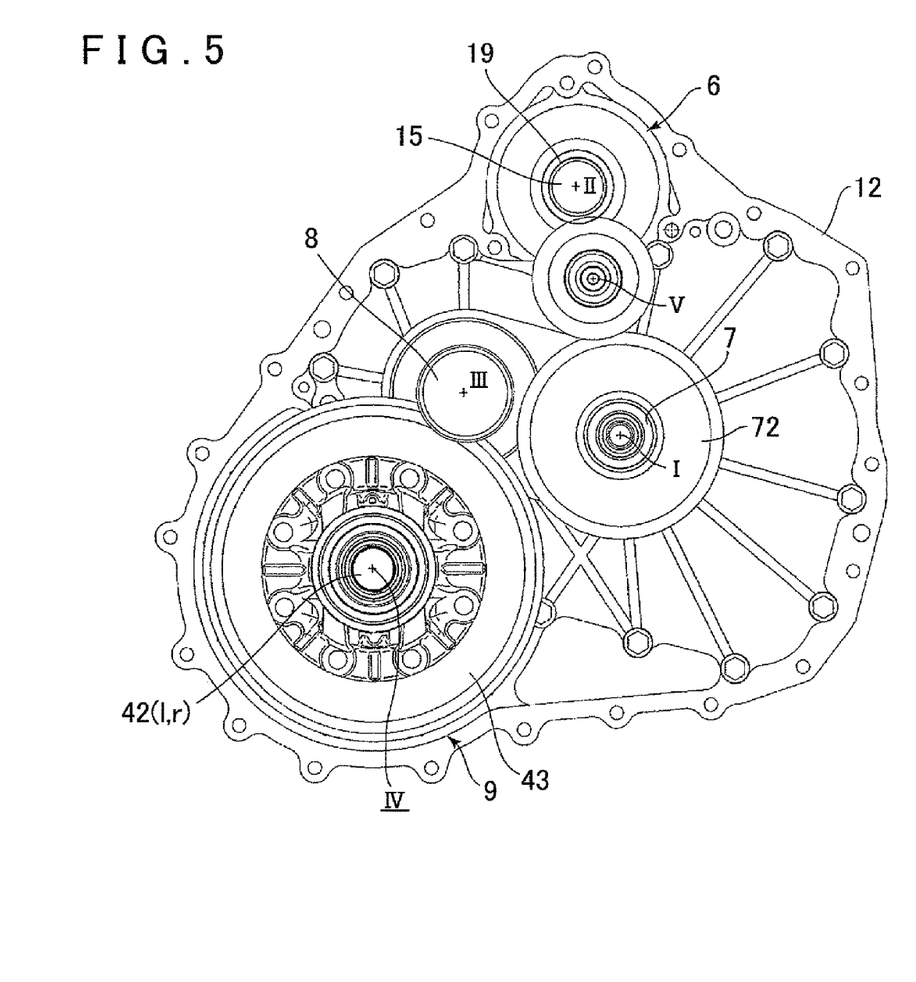
FIG. 5 is a side view of the hybrid drive system.

Referring to FIG. 5, the output shaft 15 of the electric motor 6 is the second shaft II; the intermediate shaft $4_2$ and the input shaft 7 of the input member 72 of the continuously variable transmission device, which are coaxially disposed with the engine output shaft, form the first shaft I; the output member 73 of the continuously variable transmission device and the counter shaft 8 that is the output shaft of the output member 73 form the third shaft III; the left and right axle shafts 42l, 42r form the fourth shaft IV; and the toothed idler gear shaft 11 is the fifth shaft V. These axes are all arranged parallel and supported by the case 12, and the gears (toothed gears) 19, 22, 23, 32, 43 of the gear transmission device 70 are disposed thereon. The electric motor 6 and the continuously variable transmission device $3_2$ are disposed on a first side in the axial direction of the gear transmission device 70, and a second side of the gear transmission device 70 is connected to the engine output shaft through the clutch 27 and the damper 29. Further, the second shaft II coaxial with the electric motor 6 is positioned the highest, while the fourth shaft IV coaxial with the differential device 9 is positioned the lowest. The differential ring gear 43 of the differential device 9 is partially submerged within the lubricant oil pooled inside the second space B. It should be noted that the positional relationships shown in the side view of FIG. 5 are also roughly the same for the hybrid drive system 1 that uses the multi-speed automatic transmission device 3 shown in FIG. 1.

Next, the operation of the hybrid drive system $1_2$ as described above will be explained. The hybrid drive system $1_2$ is connected to an internal combustion engine on the third space C side of the case 12, and the output shaft of the engine moves in accordance with the intermediate shaft $4_2$ through a clutch. The power from the engine is transmitted to the intermediate shaft $4_2$, and the rotation of the intermediate shaft $4_2$ is transmitted to the input-side friction wheel 72 in the cone ring type continuously variable transmission device $3_2$ through the spline 26. The power is further transmitted to the output-side friction wheel 73 through the ring 75.

During this transmission, a large contact pressure acts between the friction wheels 72, 73 and the ring 75 due to the thrust force acting on the output-side friction wheel 73 in the direction shown by the arrow D. Because the first space A is filled with the traction oil, an oil film of the traction oil is formed between the friction wheels and the ring, bringing about the extreme pressure condition. In this condition, the traction oil has a large shear force, and thus the power is transmitted between the friction wheels and the ring by the shear force of the oil film. This allows the transfer of a predetermined torque in a non-slip manner without causing wear on the friction wheels and the ring, even though the torque transfer is made through contact between metal members.

Moreover, the ring 75 moves in the axial direction smoothly to change the positions of contact between both friction wheels and the ring, thereby steplessly changing a speed.

On the other hand, the power from the electric motor 6 is transmitted to the intermediate shaft $4_2$ through the second gear 19, the toothed idler gear 22, and the first gear 23. Similar to the description above, the rotation of the intermediate shaft $4_2$ is steplessly changed in speed by the cone ring type continuously variable transmission device $3_2$, and the rotation is transmitted to the differential device 9 through the output gear 32 and the differential ring gear 43. The gear transmission device 70 formed by the above gears is accommodated in the second space B filled with the lubricant oil, and therefore the power is smoothly transmitted through the lubricant oil when the gears mesh. At such time, because the differential ring gear 43 disposed at a lower position in the second space B is formed of a large diameter gear, the differential ring gear 43 scoops up the lubricant oil so that a sufficient amount of lubricant oil is reliably supplied to the other gears (toothed gears) 19, 22, 23, 32.

Various operation modes of the engine and the electric motor, that is, operation modes as the hybrid drive systems 1, $1_1$, may be employed as necessary, including the operation mode using the multi-speed transmission device 3 shown in FIG. 1 and the operation mode using the continuously variable transmission device $3_2$ shown in FIG. 4. As an example, when the vehicle starts off, the clutch 27 is disconnected and the engine stopped so that the vehicle is started using only the torque from the electric motor 6. Once the vehicle speed reaches a predetermined speed, the engine is started and the vehicle is accelerated by the power from the engine and the electric motor. When the vehicle speed becomes a cruising speed, the electric motor goes into free rotation or is placed in a regeneration mode, and the vehicle travels using only the power from the engine. During deceleration or braking, the electric motor regenerates to charge a battery. Further, the vehicle may be started by the power from the engine using the clutch as a starting clutch, with the torque from the motor used as an assisting power.

The electric motor 6 is disposed on the first shaft I, which is different from the second shaft II formed of the intermediate shaft $4_2$ and the like, and also disposed at a position that axially overlaps with the continuously variable transmission device $3_2$. In addition, the gear transmission device 87 is disposed in a relatively narrow space among the continuously variable transmission device $3_2$, the electric motor 6, and the engine. Accordingly, even if the continuously variable transmission device is a friction wheel type continuously variable transmission device that requires relative space in the axial direction, such as the cone ring type continuously variable transmission device, the hybrid drive system $1_2$ can be made compact overall and mounted even in the relatively narrow installation space of a small passenger vehicle or the like, for example. The respective gears in particular overlap in the axial direction and match the arrangement of the electric motor 6, which reduces the axial dimension. Further, the toothed idler gear 22 overlaps the electric motor 6 in the radial direction. Thus, the electric motor and the continuously variable transmission device can be arranged in proximity to achieve a configuration with a reduced radial dimension.

Next, a partially modified embodiment will be explained with reference to FIG. 6. Note that the present embodiment differs only with regard to a form of transmission from the motor output gear (second gear) to the first gear, and other parts are identical to the previous embodiment shown in FIG. 4. Like reference numerals are used for like parts and will not be described again here. In a hybrid drive system $1_3$, a second gear 19' that is the motor output gear and a first gear 23' are formed of sprockets, and a silent chain 22' is wound between the sprockets 19', 23'. The second gear 19' is in spline engagement with the motor output shaft 15.

Therefore, the rotation of the electric motor 6 is transmitted to the intermediate shaft $4_2$ through the second gear 19' formed of a sprocket, the silent chain 22', and the first gear 23' formed of a sprocket. Note that, in place of the silent chain, another chain such as a roller chain may be used. In the present embodiment, the toothed idler gear used in the previous embodiment is not required, and the shaft support structure is correspondingly simplified (the fifth shaft V is omitted). There is an increased degree of layout design freedom regarding the electric motor 6 and the continuously variable transmission device $3_2$ (especially the input member 22), which is limited only by the extent to which the diameter of the output gear sprocket (second gear) 19' can be reduced.

The embodiment described above uses a multi-speed transmission device that has four forward speeds and is disposed on one shaft. However, the present invention is not limited to this example. A multi-speed transmission device with more than four forward speeds, or a multi-speed transmission device disposed on two or more shafts may be used. In addition, a friction type, that is, a cone ring type, continuously variable transmission device is used as the continuously variable transmission device. However, the present invention is not limited to this example, and another friction type continuously variable transmission device may be used, including: a (ring cone type) continuously variable transmission device that disposes a ring so as to encircle two conical friction wheels; a continuously variable transmission device that interposes a friction wheel between two conical friction wheels such that the friction wheel contacts both friction wheels and moves in the axial direction; a continuously variable transmission device that uses a friction wheel with a spherical shape such as a toroidal shape; and a continuously variable transmission device that is provided with pulley-shaped friction wheels of which each is formed of a pair of sheaves that biases input-side and output-side friction discs toward each other so as to sandwich a belt, wherein the pulley-shaped friction wheels move so as to change an inter-axial distance between the friction discs. Although the embodiments described above are hybrid drive systems for an FF type of vehicle, the present invention may also be applied to a hybrid drive system for an FR type of vehicle.

INDUSTRIAL APPLICABILITY

The present invention relates to a hybrid drive system that incorporates an electric motor and a friction type continuously variable transmission device such as a multi-speed continuously variable transmission device or a cone ring continuously variable transmission device, and can be installed and utilized in an automobile.

DESCRIPTION OF THE REFERENCE NUMERALS

1, $1_2$ HYBRID DRIVE SYSTEM
2 ENGINE OUTPUT SHAFT
3 (MULTI-SPEED) AUTOMATIC TRANSMISSION DEVICE
$3_2$ (CONTINUOUSLY VARIABLE) AUTOMATIC TRANSMISSION DEVICE
4, $4_2$ INTERMEDIATE SHAFT
5 MULTI-SPEED SPEED CHANGE MECHANISM
6 ELECTRIC MOTOR

7 INPUT SHAFT
8 COUNTER SHAFT
9 DIFFERENTIAL DEVICE
11 IDLING SHAFT
12 CASE
12b CLUTCH HOUSING
12$b_1$, 12h FIRST SUPPORT WALL
12e, 12i SECOND SUPPORT WALL (OIL PUMP, PARTITION)
15 MOTOR OUTPUT SHAFT
19, 19' SECOND GEAR
23, 23' FIRST GEAR
21, 20, 33, 35 BEARING
26 SPLINE
27 (DRY SINGLE-DISC) CLUTCH
29 DAMPER
30, 31, 32, 43 GEAR
45 BEARING
55 CYLINDER
59 BEARING
72 INPUT MEMBER (CONICAL FRICTION WHEEL)
73 OUTPUT MEMBER (CONICAL FRICTION WHEEL)
75 RING
I FIRST SHAFT
II SECOND SHAFT
III THIRD SHAFT
IV FOURTH SHAFT
V FIFTH SHAFT

The invention claimed is:

1. A hybrid drive system, wherein
an input shaft of an automatic transmission device, a clutch, an intermediate shaft, and a first gear are disposed on a first shaft coaxial with an engine output shaft,
an electric motor, and a second gear provided on an output shaft of the electric motor are disposed on a second shaft different from the first shaft, and
a rotation of the engine output shaft is transmitted to the input shaft of the automatic transmission device through the clutch and the intermediate shaft, and a rotation of the electric motor is transmitted to the input shaft of the automatic transmission device through the second gear and the first gear, wherein
a first support wall and a second support wall that are integrated with a case are respectively provided on an axial front side that is an engine output shaft side and an axial rear side that is an automatic transmission device side of the first gear,
the first gear and the intermediate shaft are integratedly formed with the intermediate shaft provided extending from the axial front side of the first gear, and the intermediate shaft is rotatably supported by the first support wall through a bearing,
the clutch is disposed between the intermediate shaft and the engine output shaft on an axial front side of the first support wall, and
a front side of the input shaft of the automatic transmission device is rotatably supported by the second support wall, and connected to a rear side of the intermediate shaft through a spline.

2. The hybrid drive system according to claim 1, wherein a front side of the intermediate shaft and a rear side of the engine output shaft are mutually supported through a bearing.

3. The hybrid drive system according to claim 1, wherein the clutch is a dry single-plate clutch,
the dry single-plate clutch is operated by a hydraulic actuator that includes a cylinder formed on the first support wall and a piston that fits with the cylinder, and
the hydraulic actuator is disposed so as to overlap in an axial direction with the bearing that supports the intermediate shaft.

4. The hybrid drive system according to claim 3, wherein the first gear and the second gear are toothed gears, and move in association through a toothed idler gear,
an idling shaft that includes the toothed idler gear has an axial front that is rotatably supported by the first support wall through a bearing, and an axial rear that is rotatably supported by the case through a bearing, and
the hydraulic actuator is disposed so as to overlap in the axial direction with the bearing that supports an axial front side of the idling shaft.

5. The hybrid drive system according to claim 1, wherein the clutch is a dry single-plate clutch, and
a damper is disposed between the clutch and the intermediate shaft, and at least partially overlaps with the clutch in the axial direction.

6. The hybrid drive system according to claim 1, wherein the automatic transmission device is a multi-speed transmission device that includes a multi-speed speed change mechanism that switches a transmission route formed by a plurality of gears through a clutch.

7. The hybrid drive system according to claim 6, further comprising:
a counter shaft disposed on a third shaft; and a differential device disposed on a fourth shaft, wherein
the multi-speed speed change mechanism is disposed on the first shaft, and an output rotation of the multi-speed speed change mechanism is transmitted to the counter shaft through a gear, and a rotation of the counter shaft is further transmitted to the differential device through a gear,
the counter shaft has an axial front side and an axial rear side each rotatably supported by the case through a bearing, and
a support portion of the case that supports the axial front side of the counter shaft is disposed so as to overlap in the axial direction with the first gear.

8. The hybrid drive system according to claim 1, wherein the automatic transmission device is a continuously variable automatic transmission device that includes an input member drive-coupled to the input shaft, and an output member, wherein a contact position between the input member and the output member is changed, and a rotation of the input member is steplessly changed in speed and transmitted to the output member by a shear force of an oil film interposed at the contact position.

* * * * *